United States Patent [19]

Goldstein et al.

[11] Patent Number: 5,378,329

[45] Date of Patent: * Jan. 3, 1995

[54] PROCESS FOR THE PREPARATION OF AN ALKALINE-ZINC SLURRY FOR USE IN BATTERIES

[75] Inventors: Jonathan R. Goldstein; Inna Gektin, both of Jerusalem; Menachem Givon, HaNegev, all of Israel

[73] Assignee: Electric Fuel (E.F.L.) Ltd., Jerusalem, Israel

[ * ] Notice: The portion of the term of this patent subsequent to Jul. 20, 2010 has been disclaimed.

[21] Appl. No.: 88,543

[22] Filed: Jul. 6, 1993

Related U.S. Application Data

[63] Continuation-in-part of Ser. No. 636,411, Dec. 31, 1990, Pat. No. 5,228,958.

[51] Int. Cl.6 .............................................. C25C 1/16
[52] U.S. Cl. .................................... 204/115; 204/116; 204/130; 429/17; 429/19; 429/21; 429/49
[58] Field of Search ............... 204/115, 114, 116, 130; 429/17, 19, 21, 49

[56] References Cited

U.S. PATENT DOCUMENTS

| | | | |
|---|---|---|---|
| 5,228,958 | 7/1993 | Goldstein et al. | 204/115 |
| 5,232,798 | 8/1993 | Goldstein et al. | 429/229 |

*Primary Examiner*—Kathryn Gorgos
*Attorney, Agent, or Firm*—Helfgott & Karas

[57] ABSTRACT

A process for the preparation of an alkaline-zinc slurry for use in batteries, the slurry comprising an admixture of (a) at least partly oxidized zinc; (b) an aqueous solution of at least one Group Ia metal; and (c) an inorganic or organic inhibitor. The process includes the steps of electrolyzing the admixture in a cell with a corrosion-resistant anode and a non-zinc-adherent cathode such that the zinc deposits on the cathode self-detach or are removed until no more than a preselected amount of zinc remains in the solution, provided that the current density at the cathode is preselected so that the electrowon zinc will have, after homogenizing into particles, a density within the range 0.2–2.0 g/cc and a surface area within the range 0.5–6.0 m$^2$/g; removing zinc from the cathode and homogenizing it into particles; and combining the homogenized zinc particles with additional aqueous Group Ia metal hydroxide and optionally with other makeup components selected from the group consisting of water and inhibitor to form a charged slurry.

16 Claims, No Drawings

PROCESS FOR THE PREPARATION OF AN ALKALINE-ZINC SLURRY FOR USE IN BATTERIES

The present specification is a continuation-in-part of U.S. patent application Ser. No. 636,411, filed Dec. 31, 1990, now U.S. Pat. No. 5,228,958.

The present invention relates to a process for the preparation and/or regeneration of an alkaline-zinc slurry utilisable in rechargeable zinc batteries such as zinc-air batteries, and more particularly to such rechargeable electric batteries intended for use in electric vehicles and energy storage systems. The slurry may also be used in primary zinc-based cells and batteries such as zinc-air and zinc-manganese dioxide cells and batteries.

BACKGROUND OF THE INVENTION

Various proposals have been made in the past for electric-powered vehicles. To date, for a number of reasons, electric vehicle systems have yet to become generally commercially viable for urban and highway applications. There have been proposals to employ zinc-air batteries for urban vehicle propulsion. An example is the publication "Improved Slurry Zinc-Air Systems as Batteries for Urban Vehicle Propulsion", by P. C. Foller, *Journal of Applied Electrochemistry*, Vol. 16, pp. 527–543 (1986).

Metal-air battery structures are described in the following publications: U.S. Pat. No. 4,842,963, entitled "Zinc Electrode and Rechargeable Zinc-Air Battery"; U.S. Pat. No. 4,147,839, entitled "Electrochemical Cell with Stirred Slurry"; U.S. Pat. No. 4,908,281, entitled "Metal-Air Battery with Recirculating Electrolyte"; U.S. Pat. No. 3,847,671, entitled "Hydraulically-Refuelable Metal-Gas Depolarized Battery System"; U.S. Pat. No. 4,925,744, entitled "Primary Aluminum-Air Battery"; U.S. Pat. No. 3,716,413, entitled "Rechargeable Electrochemical Power Supply"; U.S. Pat. No. 4,925,744, entitled "Primary Aluminum-Air Battery".

In U.S. Pat. No. 3,592,698, entitled "Metal Fuel Battery with Fuel Suspended in Electrolyte", there is described inter alia a method for circulating an electrolyte/metal fuel powder mixture through the batteries; U.S. Pat. No. 4,126,733, entitled "Electrochemical Generator Comprising an Electrode in the Form of a Suspension" relates to a similar subject, using a circulated suspension of inert cores coated with an electrochemically active material. In U.S. Pat. No. 4,341,847, entitled "Electrochemical Zinc-Oxygen Cell", there is described a method in which an electrolyte is circulated in the annular space between concentric electrodes.

Electrical energy storage systems are described in the following publications: U.S. Pat. No. 4,843,251, entitled "Energy Storage and Supply Battery with Recirculating Electrolyte"; "Energy on Call" by John A. Casazza, et al., *IEEE Spectrum*, June 1976, pp. 44–47; U.S. Pat. No. 4,275,310, entitled "Peak Power Generation"; U.S. Pat. No. 4,124,805, entitled "Pollution-Free Power Generating and Peak Power Load Shaving System"; U.S. Pat. No. 4,797,566, entitled "Energy Storing Apparatus".

Regeneration of spent zinc-containing alkaline electrolyte is described in a number of prior patents. For example, in U.S. Pat. No. 3,847,671 (mentioned above), whole spent electrolyte is subjected to electrolysis, when zinc deposited at the cathode is removed with a wiper blade. The thus-removed zinc is said to be substantially heavier than the electrolyte (35–40% KOH) and hence falls to the bottom of each cell. In a particular embodiment, the cathode and anode are specified as being made from copper (or silver-plated copper) and carbon, respectively. In U.S. Pat. No. 3,981,747, it is proposed to regenerate the spent zinc in an alkaline electrolyte by reaction with a strongly electropositive metal, such as magnesium or aluminum, which displaces the zinc. In U.S. Pat. No. 4,341,847 (also mentioned above), spent zinc in the alkaline electrolyte is regenerated either by reversing the current and plating zinc on the anode, or by mechanically replacing zinc oxide particles by active zinc particles.

Moreover, it is of importance in batteries containing zinc electrodes that the zinc should not be consumed by a reaction with aqueous electrolyte, especially alkaline electrolyte which generates hydrogen gas, which reaction merely corrodes the zinc and prevents its availability for producing electric current. A number of prior patents relate to this problem.

Thus, e.g., in U.S. Pat. No. 4,112,205, double salts containing both mercuric and quaternary ammonium ions are used as inhibitors in galvanic cells comprising zinc anodes, notably in Leclanche-type batteries containing ammonium chloride/zinc chloride electrolyte; U.S. Pat. No. 3,945,849 employs quaternary ammonium halides as inhibitor for zinc anodes in similar primary cells. U.S. Pat. No. 4,195,120 teaches alkaline cells containing a predominantly zinc anode and, as a hydrogen evolution inhibitor, a surfactant which is an organic phosphate ester of the ethylene oxide adduct type. Metal oxide inhibitors for zinc (in practice ZnO) electrodes are described in U.S. Pat. No. 4,084,047, in which the inhibitors are mixed thoroughly into the ZnO; the inhibitors taught in this patent are binary combinations of oxides which exclude mercuric oxide, the latter being regarded as an ecologically unsatisfactory additive for the ZnO electrode. According to U.S. Pat. No. 4,084,047, it was known to mix or alloy the active zinc in zinc-zinc oxide anodes and their supporting grid (e.g., copper or silver structures) with 0.5–5.0 wt. % mercury or mercuric oxide.

It will also be appreciated by persons skilled in the art that amalgamation of zinc with mercury has been known for a very long time, and that it is carried out in neutral, or more usually, in acid, solution, e.g., by reacting zinc with mercury chloride in dilute hydrochloric acid.

In U.S. patent application Ser. No. 636,411, there is described and claimed a process for the regeneration of an at least partially-spent slurry having a dissolved phase and an undissolved phase for use in metal-air batteries.

In U.S. patent application Ser. No. 636,426, there is described and claimed a method for the inhibition of corrosion in particulate zinc.

The disclosures of all of the foregoing publications (including patents), including also the prior art described therein, are explicitly incorporated herein by reference.

SUMMARY OF THE INVENTION

It is an object of the present invention to make possible, from a practical point of view, the general commercial viability of zinc-alkaline batteries, more particularly zinc-air batteries for use in electric vehicle propulsion and energy storage systems. A more specific object of the invention is to provide a process for preparing a zinc slurry for zinc-alkaline cells and/or regenerating a rechargeable slurry for use in zinc-air batteries. Such a slurry would be applicable, for example, in a mechanically refuelable zinc-air battery in which, following discharge, the spent zinc is replaced with regenerated zinc for the subsequent discharge.

Another object of the invention is to provide a method for the inhibition of corrosion in particulate zinc for use in zinc-alkaline batteries and rechargeable zinc-air batteries, and more particularly, in such batteries intended for use in electric vehicles and energy storage systems.

Other objects of the invention will become apparent from the description which follows.

The present invention accordingly provides a process for the regeneration of an at least partially spent slurry for use in zinc-air batteries, which slurry comprises an admixture of:

(a) zinc which has been at least partly oxidized to an oxidation product selected from zinc oxide, zinc hydroxide and zincates;
(b) an aqueous solution of at least one Group Ia metal comprising anions selected from hydroxide and zincate, and
(c) an inorganic and/or organic inhibitor ingredient effective to inhibit the interaction of zinc and at least one Group Ia metal hydroxide in aqueous solution, which would otherwise result in the evolution of hydrogen gas.

The present invention relates particularly to zinc-alkali slurries and anodes based on porous, low-density zinc, e.g., porous zinc having a density within the range of 0.2–2.0 g/cc.

More specifically, the present invention provides a process for the preparation of an alkaline-zinc slurry for use in batteries, said slurry comprising an admixture of:

(a) zinc which has been at least partly oxidized to an oxidation product selected from the group consisting of zinc oxide, zinc hydroxide and zincares;
(b) an aqueous solution of at least one Group Ia metal comprising anions selected from the group consisting of hydroxide and zincate; and
(c) an inorganic or organic inhibitor, effective to inhibit the interaction of zinc and at least one Group Ia metal hydroxide in aqueous solution, which would otherwise result in the evolution of hydrogen gas;

said process comprising electrolyzing said admixture in a cell with a corrosion-resistant anode and a non-zinc-adherent cathode such that the zinc which deposits on said cathode self-detaches or is removable by a method selected from brushing, scraping, vibrating, the use of liquid jets, either fixed or moving, and the use of electrical pulsing, until no more than a preselected amount of zinc remains in the solution, provided that the current density at the cathode is preselected so that in conjunction with the non-zinc-adherent characteristic of the cathode, the electrowon zinc will have, after homogenizing into particles, a density within the range 0.2–2.0 g/cc and a surface area within the range 0.5–6.0 $m^2/g$; removing zinc from the cathode and homogenizing it into particles by a method selected from brushing, stirring or blending; combining said homogenized zinc particles with additional aqueous Group Ia metal hydroxide and optionally with other makeup components selected from the group consisting of water and inhibitor to form a charged slurry; optionally analyzing said charged slurry in order to ascertain whether at least one of the values of zinc, the Group Ia metal hydroxide and the inhibitor lie within predetermined limits; and optionally adjusting the values of at least one of said aforementioned components, if necessary, to within predetermined limits for said charged slurry.

The present invention also provides a process for the regeneration of an at lease partially-spent alkaline-zinc slurry having a dissolved phase and an undissolved phase for use in metal-air batteries, which slurry comprises an admixture of:

(a) zinc which has been at least partly oxidized to an oxidation product selected from the group consisting of zinc oxide, zinc hydroxide and zincates;
(b) an aqueous solution of at least one Group Ia metal comprising anions selected from the group consisting of hydroxide and zincate; and
(c) an inorganic or organic inhibitor, effective to inhibit the interaction of zinc and at least one Group Ia metal hydroxide in aqueous solution, which would otherwise result in the evolution of hydrogen gas;

said process comprising subjecting said at least partially-spent slurry, after optional dilution with aqueous Group Ia metal hydroxide and water and the optional addition of an inorganic or organic inhibitor, to the seeps of: optionally separating said dissolved and undissolved phases; providing an electrolyte selected from the group consisting of said at least partially-spent slurry and said optionally-separated dissolved phase; electrolyzing said electrolyte in a cell with a corrosion-resistant anode and a non-zinc-adherent cathode such that the zinc which deposits on said cathode self-detaches or is removable by a method selected from brushing, scraping, vibrating and the use of liquid jets, either stationary or moving, and the use of electrical pulsing, until no more than a preselected amount of zinc remains in the solution, provided that the current density at the cathode is preselected so that in conjunction with the non-zinc-adherent characteristic of the cathode, the electrowon zinc will have, after homogenizing into particles, a density within the range 0.2–2.0 g/cc and a surface area within the range 0.5–6.0 $m^2/g$; removing zinc from the cathode and homogenizing it into particles by a method selected from brushing, stirring or blending; combining said homogenized zinc particles with additional aqueous Group Ia metal hydroxide and optionally with other makeup components selected from the group consisting of water and inhibitor, thereby regenerating reconstituted charged slurry; optionally analyzing said reconstituted charged slurry in order to ascertain whether at least one of the values of zinc, the Group Ia metal hydroxide and the inhibitor lie within predetermined limits; and optionally adjusting the values of at least one of said aforementioned zinc, Group Ia metal hydroxide or inhibitor to within predetermined limits for said reconstituted charged slurry.

DETAILED DESCRIPTION OF THE INVENTION

In a particular embodiment according to the process of the present invention, particulate zinc formed during or after the process, in an alkaline slurry, or alkaline plating bath, is subjected to the action of an effective corrosion-inhibiting amount of at least one cation species selected from the metals antimony, bismuth, cadmium, gallium, indium, lead and tin. The cation species is provided by dissolving the oxide, hydroxide, carbonate or sulfate of the inhibitor metal(s) in aqueous Group Ia metal hydroxide so as to separate or maintain a concentration of 5–1000 ppm. Similarly, organic inhibitor may be added to a concentration level of 0.05–1 wt. % in the aqueous Group Ia metal hydroxide solution. The at least one inhibitor metal is taken up in the product zinc, and preferably constitutes 0.001–4.0 (e.g., 0.04–4.0) percent by weight, based on the weight of the zinc.

Examples of slurry components (a)–(c) mentioned above are: (a) zinc oxide, zinc hydroxide, zincares; (b) potassium hydroxide, sodium hydroxide, lithium hydroxide; (c) inhibitors selected from the inorganic inhibitors recited in the preceding paragraph, namely, cations formed from the dissolving in alkali of lead oxide, cadmium oxide, tin oxide, antimony oxide, bismuth oxide, gallium oxide, indium oxide (or the corresponding hydroxides, carbonates or sulfates), or including the organic inhibitor tetramethyl-ammonium hydroxide.

In the reconstituted charged slurry obtained by the process of the invention, the weight ratio zinc:aqueous Group Ia metal hydroxide(s) solution is preferably 1:0.05–12; when component (c) is present, having built up in the zinc, the preferred zinc:(c) weight ratio is 1:0.00001–0.04 (e.g., 1:0.0005–0.04).

It is preferred that in the electrolysis step the current density at the cathode, which may be, for example, within the range of 10–600 milliamp/cm$^2$, is preselected so that, in conjunction with the non-zinc-adherent characteristic of the cathode, the electrowon zinc will have, after consolidating into a particulate structure, a density within the range 0.2–2.0 (e.g., 0.3–1.1) g/cc and a surface area within the range 0.75.–5.0 m$^2$/g.

Exemplary non-zinc-adherent cathodes may be made of, e.g., magnesium, titanium, vitreous carbon or stainless steel. An exemplary corrosion-resistant anode may be made of, e.g., nickel, sintered nickel, or nickel mesh with a surface coating of an electrocatalyst having a low overvoltage for oxygen evolution, for instance, a mixed oxide of cobalt and nickel.

The electrolysis step may, for example, be carried out in a batch process at a temperature within the range 20°–75° C., e.g., for a time period of between 10 and 120 minutes. It is also contemplated that the electrolysis step may be carried out continuously, as part of an overall continuous regeneration process. In continuous or semi-continuous regeneration systems it is feasible to remove the accumulated zinc from the cathode at regular intervals, for example, by operating the chosen removal technique for 3–15 seconds every 1–5 minutes.

Illustratively, the dissolved phase separated in step (i) may be from 5 to 12 molar in potassium ions and may contain from 1 to 100 g/liter dissolved zinc ions, 5–1,000 ppm of inhibitor cation(s), and 0.05–1 wt. % organic inhibitor. The electrolysis may be carried out until (by way of example) no more than 20 g/liter of zinc remains in the solution.

In a further preferred embodiment, useful for first-time zinc slurry generation, the zinc particles are prepared by electrowinning from a newly-formulated alkaline zincate solution, this cell feedstock alkaline zincate solution having been prepared from zinc oxide, Group Ia metal hydroxide, water, and added inhibitor, either inhibitor metal oxides, hydroxides, carbonates or sulfates, dissolved in the feedstock to give inhibitor cations, at 5–1000 ppm in the solution, or organic inhibitor added to the feedstock at the concentration level of 0.05–1 wt. %. As electrowinning proceeds, the inhibitor level is maintained within a predetermined concentration range.

In a yet further preferred embodiment, particulate zinc slurries may be enriched in inhibitor metal content by agitating together for a period of 1–20 hours with aqueous Group Ia metal hydroxide containing dissolved inhibitor cation(s) (made by dissolving the inhibitor metal oxide(s), hydroxide(s), carbonate(s) or sulfate(s) in a solution of Group Ia metal hydroxide) having an inhibitor parent metal concentration level of 5–1000 ppm.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

A zinc-containing electrolytic slurry was prepared for discharge in a zinc-air cell. The slurry was made by thoroughly mixing together zinc powder (50 g, 30 mesh, having a density and surface area, respectively, of approximately 0.6 g/cc and 1.0 m$^2$/g), 30 wt. % aqueous potassium hydroxide solution (40 g), containing dissolved lead (II) oxide (0.03 g) as zinc-corrosion inhibitor. The slurry had a density of approximately 1.5 g/ml; there was no appreciable generation of hydrogen bubbles over a time period.

Enough slurry to provide about 33 g zinc was pressed into a removable anode frame that could be inserted into and removed from the zinc-air cell. The anode was inserted into the cell and discharge commenced at a current of 2 Amperes. About 20 Ahr. of discharge capacity was observed, 2 A for 10 hours at an average voltage of 1.2 V until a 1.1 V cutoff. At this point, only about three-quarters of the zinc had actually been discharged.

The spent zinc anode was pulled out of the cell and the partially-discharged slurry was dislodged from the anode frame with the aid of about 950 ml of 30 wt. % aqueous potassium hydroxide solution containing 2 wt. % dissolved zinc oxide. The slurry/rinsing solution mixture was stirred for about 30 minutes at 50° C. This mixture contained dissolved potassium zincate, potassium hydroxide, undissolved zinc particles, and corrosion inhibitor.

The solid and liquid components were separated by filtration through porous nylon and the filtered solids were retained for later reformulation. The clear filtrate was transferred to an electrolytic bath, which contained two immersed nickel anodes flanking a central vitreous carbon cathode. Each plate had the dimensions 50×50×1 mm, and was fitted with current-carrying leads; there was a 10 mm space on each side between the cathode and the anodes.

The electrolyte was circulated at a rate of 50 ml/minute, while a current of 15 A was applied (300 milliamp/cm$^2$ at the cathode) at a voltage of 2.7 V. The bath temperature was maintained at 20°–30° C. by external cooling. The electrolyte returning from the cooler was directed so as to stream between the plates, entering at the base of the bath and exiting at above the level of the top of the plates, thereby immediately removing the hot liquid zone and any gas bubbles. From time to time, deionized water or alkali was added to the bath to maintain the alkali concentration.

The cathode was transferred to a separate container every ten minutes, where the deposited zinc was removed by scraping with a plastic spatula and homogenized into a particulate structure by means of a revolving brush made of NYLON®, a long-chain synthetic polymeric amide which has recurring amide group as an integral part of the main polymer chain while a clean cathode was placed in the electrolytic bath to continue the zinc recovery process. The brush was operated at 1000 rpm for three minutes, which afforded alkali-moist zinc particles below about 30 mesh particle size, suitable for reformulation of the slurry for reuse in the battery discharge process. The zinc particles had a density of 0.7 g/cc and a surface area of 1.1 m$^2$/g.

After about 85 minutes of electrolyzing the separated liquid phase from the discharged slurry, the bath was found on analysis to contain about 2 wt. % zinc oxide, the original concentration of the slurry rinse-out solution. This indicated that all of the zinc in the dissolved phase of the discharged slurry had been recovered. On a duplicate run, with washing to remove alkali and drying of the electrolytically-recovered zinc, the dry zinc content of the particles was about 24.5 g, indicating a zinc regeneration coulombic current efficiency of about 95% at the specified current density.

Approximately, 30 ml of slurry were reconstituted for a further discharge in the zinc-air cell. The alkali-moist zinc particles were mixed with the solid residue from the nylon filter and make-up alkaline rinse solution. The mixture was agitated for one hour to ensure adequate equilibration of the inhibitor with the freshly regenerated zinc particles, and the slurry density was again about 1.5 g/ml. The slurry now appeared with a similar mesh size as before, and exhibited no appreciable generation of hydrogen bubbles. In the zinc-air cell, it gave an equivalent discharge performance to the first run. The Zn:K ratio in the slurry, which contained approximately 60 wt. % zinc as determined by atomic absorption spectroscopy on a 5 g slurry sample, was about 6:1.

EXAMPLE 2

A clear solution (1 liter) containing 30 wt. % aqueous potassium hydroxide, 40 g dissolved zinc oxide and 0.1 g inhibitor lead (II) oxide, was transferred to an electrolytic bath which contained two immersed nickel anodes flanking a central vitreous carbon cathode. Each plate had the dimensions 50×50×1 mm, and was fitted with current-carrying leads; there was a 20 mm space on each side between the cathode and the anodes.

An electrowinning current of 15 A (300 milliamp/cm$^2$ at the cathode) was applied to the electrowinning cell at a voltage of 2.4 V. The bath temperature stabilized at 70° C. without the need for external cooling. From time to time, deionized water or alkali was added to the bath to maintain the alkali concentration.

The cathode was scraped every 2 minutes for 10 seconds with a plastic blade, and every half hour the zinc that fell to the bottom of the bath was transferred to a separate container. This zinc was then blended with a blender into a particulate structure. The blending step afforded alkali-moist zinc particles below about 30 mesh particle size, and having a bulk intensity of 0.6 g/cc.

After about 115 minutes of electrolysis, there was obtained a quantity of alkali-moist zinc, containing about 33 g dry zinc, thus indicating a current efficiency of about 95% at the specified current density. The zinc contained about 1000 ppm lead. By gasometric methods, the zinc was found to have a low gassing rate for hydrogen, 0.04 ml/hr/g.zinc (compared to 0.2 ml/hr/g.zinc for undoped zinc), on attempted reaction with 30 wt. % KOH at 30° C. Similar results were obtained using inhibitor cation(s) other than those from lead (II) oxide.

It was surprisingly found that the zinc from electroplating baths with a low or insignificant amount of inhibitor cation(s) could be given additional corrosion protection by simply reacting for some hours with a solution (e.g., alkaline) of inhibitor cations. For example, lead-free zinc (33 g) stirred overnight with 1 liter of 30 wt. % KOH containing dissolved PbO (0.1 g) provided acceptable inhibition of corrosion on repeated recycling, with minimal makeup inhibitor. The lead-doped alkaline-moist zinc was mixed with 25 g of 30 wt. % aqueous potassium hydroxide, and gave a slurry having a density of about 1.5 g/ml. Enough slurry to provide 33 g of zinc which exhibited no generation of hydrogen bubbles was introduced into the anode frame compartment of a zinc-air cell. The cell provided 2 A for 10 hours at an average discharge rate of 1.2 V, until a cut-off voltage of 1.1 V. Since there were about 33 g zinc in the cell, the zinc utilization was about 75%. When the discharge was run with untreated zinc, the cell passivated after 15 minutes, due to excessive hydrogen gassing which blocked the electrolyte path to the air electrodes of the cell.

EXAMPLE 3

Following the details of Example 2, but substituting 0.05 g $Bi_2O_3$ and 0.05 g $In_2O_3$ in place of PbO gave similar results, but the corrosion rate was somewhat higher, 0.06 ml/hr/g.zinc.

It will be evident to those skilled in the art that the invention is not limited to the details of the foregoing illustrative examples and that the present invention may be embodied in other specific forms without departing from the essential attributes thereof, and it is, therefore, desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for the preparation of an alkaline-zinc slurry for use in batteries, said slurry comprising an admixture of:
   (a) zinc which has been at least partly oxidized to an oxidation product selected from the group consisting of zinc oxide, zinc hydroxide and zincates;
   (b) an aqueous solution of at least one Group Ia metal comprising anions selected from the group consisting of hydroxide and zincate; and
   (c) an inorganic or organic inhibitor, effective to inhibit the interaction of zinc and at least one Group Ia metal hydroxide in aqueous solution, which would otherwise result in the evolution of hydrogen gas;
   said process comprising the steps of:
      electrolyzing said admixture in a cell with a corrosion-resistant anode and a non-zinc-adherent cathode such that the zinc which deposits on said cathode self-detaches or is removable by a method selected from the group consisting of brushing, scraping, vibrating and the use of liquid jets, until no more than a preselected amount of zinc remains in the solution, provided that the current density at the cathode is preselected so that in conjunction with the non-zinc-adherent characteristic of the cathode, the electrowon zinc will have, after homogenizing into particles, a density within the range 0.2–2.0 g/cc and a surface area within the range 0.5–6.0 $m^2/g$;
      removing zinc from the cathode and homogenizing it into particles;
      combining said homogenized zinc particles with additional aqueous Group Ia metal hydroxide and optionally with other makeup components selected from the group consisting of water and inhibitor to form a charged slurry;
      optionally analyzing said charged slurry in order to ascertain whether at least the values of zinc, the Group Ia metal hydroxide and the inhibitor lie within preset limits; and
      optionally adjusting the values of at least one of said aforementioned zinc, Group Ia metal hydroxide or inhibitor to within preset limits for said charged slurry.

2. The process according to claim 1, wherein said inhibitor constitutes about 0.001–4.0 percent by weight, based on the weight of the zinc.

3. The process according to claim 1, wherein said zinc particles are homogenized to a density within the range of about 0.25–1.7 g/cc.

4. The process according to claim 1, wherein said electrolysis step is carried out at a temperature within the range of about 20°–75° C.

5. The process according to claim 1, wherein said zinc is homogenized into particles by a method selected from the group consisting of brushing, stirring, and blending.

6. The process according to claim 1, wherein the preselected current density at the cathode lies within the range of 10–600 milliamp/$cm^2$.

7. The process according to claim 1, wherein said cathode is made of a metal selected from the group consisting of titanium, vitreous carbon, magnesium and stainless steel.

8. The process according to claim 1, wherein said anode is made of a metal selected from the group consisting of nickel, porous nickel, fibrous nickel and nickel mesh having a surface coating of a mixed oxide of cobalt and nickel.

9. The process according to claim 1, wherein said inhibitor is at least one cation species selected from the group consisting of antimony, bismuth, cadmium, gallium, indium, lead and tin.

10. A process according to claim 9, wherein said inhibitor constitutes about 0.001–4.0 percent by weight, based on the weight of the zinc.

11. The process according to claim 9, wherein said zinc particles are homogenized to a density within the range of about 0.25–1.7 g/cc.

12. The process according to claim 9, wherein said electrolysis step is carried out at a temperature within the range of about 20°–75° C.

13. The process according to claim 9, wherein said zinc is homogenized into particles by a method selected from th group consisting of brushing, stirring, and blending.

14. The process according to claim 1, wherein said inhibitor is tetramethylammonium hydroxide.

15. The process according to claim 1, wherein, in said charged slurry, the weight ratio of zinc to aqueous Group Ia metal hydroxide solution is 1:0.05–12 and said inhibitor is present in a weight ratio of zinc to inhibitor of 1:0.00001–0.04.

16. A process for the regeneration of an at least partially-spent alkaline-zinc slurry having a dissolved phase and an undissolved please for use in metal-air batteries, which slurry comprises an admixture of:
   (a) zinc which has been at least partly oxidized to an oxidation product selected from the group consisting of zinc oxide, zinc hydroxide and zincates;
   (b) an aqueous solution of at least one Group Ia metal comprising anions selected from the group consisting of hydroxide and zincate; and
   (c) an inorganic or organic inhibitor, effective to inhibit the interaction of zinc and at least one Group Ia metal hydroxide in aqueous solution, which would otherwise result in the evolution of hydrogen gas;
   said process comprising subjecting said at least partially-spent slurry, after optional dilution with aqueous Group Ia metal hydroxide and water and the optional addition of an inorganic or organic inhibitor, to the steps of:
      optionally separating said dissolved and undissolved phases;
      providing an electrolyte selected from the group consisting of said at least partially-spent slurry and said optionally-separated dissolved phase;
      electrolyzing said electrolyte in a cell with a corrosion-resistant anode and a non-zinc-adherent cathode such that the zinc which deposits on said cathode self-detaches or is removable by a method selected from the group consisting of brushing, scraping, vibrating and the use of liquid jets, until no more than a preselected amount of zinc remains in the solution, provided that the current density at the cathode is preselected so that in conjunction with the non-zinc-adherent characteristic of the cathode, the electrowon zinc will have, after homogenizing into particles, a density within the range 0.2–2.0 g/cc and a surface area within the range 0.5–6.0 $m^2/g$;
      removing zinc from the cathode and homogenizing it into particles;

combining said homogenized zinc particles with additional aqueous Group Ia metal hydroxide and optionally with other makeup components selected from the group consisting of water and inhibitor, thereby regenerating reconstituted charged slurry;

optionally analyzing said reconstituted charged slurry in order to ascertain whether at least the values of zinc, the Group Ia metal hydroxide and the inhibitor lie within preset limits; and optionally adjusting the values of at least one of said aforementioned zinc, Group Ia metal hydroxide or inhibitor lie within preset limits for said reconstituted charged slurry.

* * * * *